May 26, 1942.  E. P. QUINBY  2,284,342
FOOD STRAINER
Filed Feb. 23, 1940
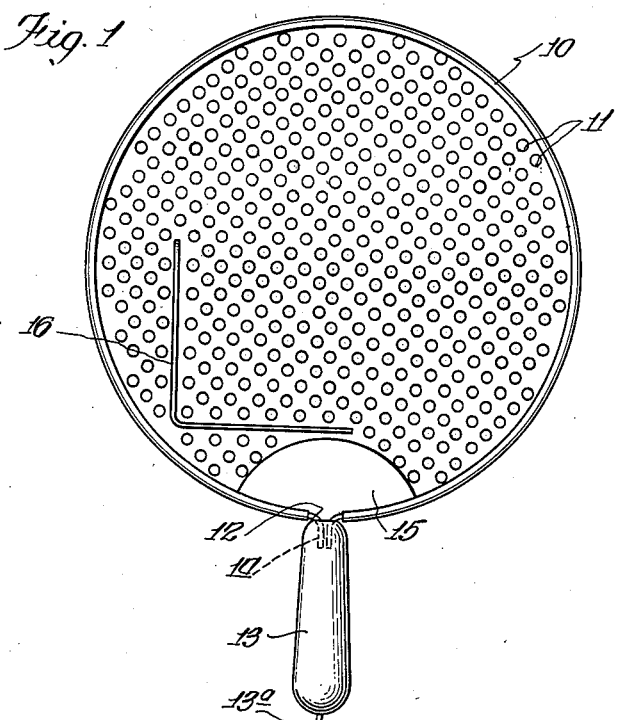
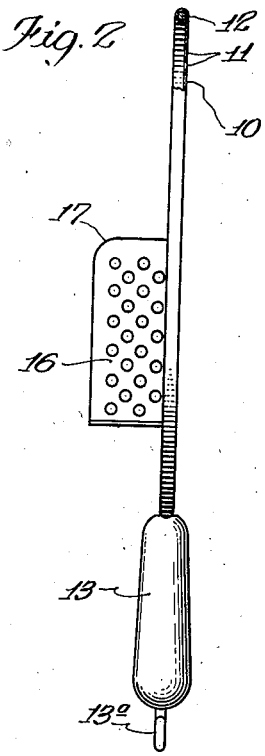
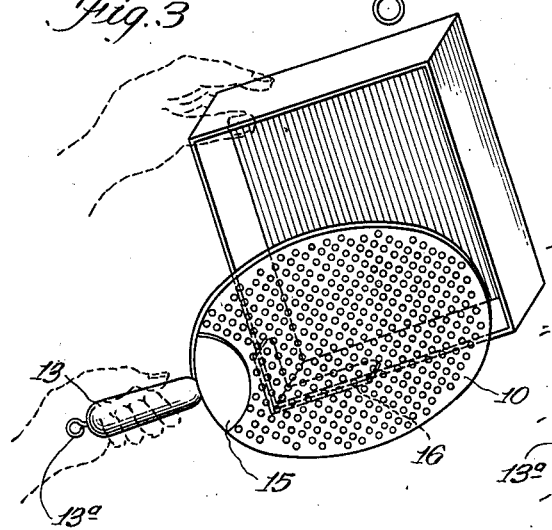
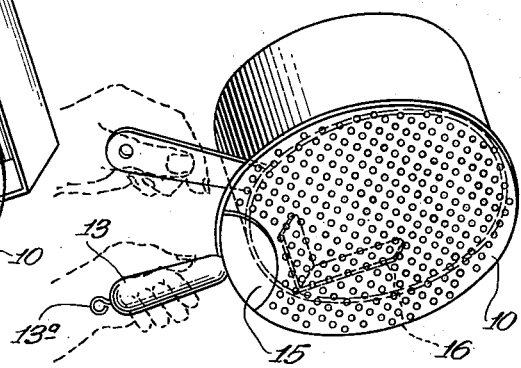
Inventor:
Elliott P. Quinby
By: Milo B. Stevens & Co.
Atty's.

Patented May 26, 1942

2,284,342

UNITED STATES PATENT OFFICE 2,284,342

FOOD STRAINER

Elliott P. Quinby, Western Springs, Ill.

Application February 23, 1940, Serial No. 320,474

4 Claims. (Cl. 210—161)

My invention relates to food strainers and is intended more particularly to supplant the conventional colander, and my main object is to provide a strainer which is of an exceedingly simple character.

A further object of the invention is to design a strainer which is readily applicable to any type of vessel and which does not employ any material or parts which are not essentially for the purpose of the strainer.

Another object of the invention is to provide a strainer which is readily adaptable to strain foods from either the conventional round type of vessels or the square or oblong type found in refrigerators or employed in restaurants.

An important object of the invention is to construct the same along economical lines and for easy handling.

With the above objects in view and any others which may suggest themselves from the description to follow, a better understanding of the invention may be had by reference to the accompanying drawing, in which—

Fig. 1 is a front elevation of the strainer;

Fig. 2 is a right-hand side view of Fig. 1, partly in section;

Fig. 3 is a perspective view, showing the strainer in use with an oblong vessel; and Fig. 4 is a similar view showing a strainer in use with a round vessel.

Commonly, a colander is employed to strain bulky foods, such as spaghetti, cooked vegetables and the like, it being the custom to transfer the entire contents of the food vessel into the colander as a second vessel. However, I have found that it is not necessary to employ a second vessel for the food being strained, as the strained food does not remain in such a vessel but is again transferred to the original or a different final vessel. In keeping with this, I have developed the novel strainer along such lines as to limit it to its specific function, so that it becomes a far simpler utensil than the large and comparatively expensive colander.

In accordance with the foregoing, specific reference to the drawing indicates the novel strainer at 10, the same being a thin disk of sheet metal which is tinned or otherwise protected against corrosion and made with fine perforations 11 along the greater portion of its surface. In addition, the disk, whose form is circular, is rolled along its periphery to receive a wire ring 12 for stiffening purposes.

The disk 10 receives a wooden handle 13 at the bottom, being secured thereto by extensions of the ring 12 in the form of stems 14 which are embedded in the upper end of the handle; or, any other method may be used to secure the disk to the handle which combines strength with simplicity. Also, the disk may be reinforced at the bottom with segmental side plates 15 which are soldered or otherwise united with the bottom portion of the disk to become rigid parts thereof. Thus, it may be assumed that the disk 10 is rigidly connected to the handle and is rendered firm by its marginal reinforcement. The handle is supplemented at the bottom by a screw-eye 13a to facilitate the suspension of the strainer in inverted position from a wall hook or nail.

An angular member 16 of the same material as the disk 10 is secured to one side of the latter a short distance from the bottom. The member 16 is perforated similarly to the disk; and its outer corners are rounded, as indicated at 17, to render its handling safe. The inner edge of the member is soldered or otherwise firmly attached to the face of the disk, so as to form a rigid assembly therewith.

In the use of the novel strainer, it is carried with the right hand by means of the handle 13 in the manner of a fan and tilted forward over the sink or a convenient drain. If the food to be strained is in a square or oblong pan, it is only necessary to seat the latter with one corner in the member 16, as indicated in Fig. 3, so that the food collects in the lower part of the vessel as it faces the strainer. The vessel is then swung against the face of the strainer. When the straining is over, the vessel is swung back from the strainer to restore the strained food to its original position, and the strainer put away.

When the food to be strained is in a round vessel, such as a pot or pan, the process just explained may be employed, except that the vessel is placed with its rim under or outside of the member 16 and then advanced on the strainer, as suggested in Fig. 4. Or, the vessel could be rested in the corner or pocket of the member 16, as in the case of the rectangular vessel, particularly if the contents are heavy. On the other hand, if the food is in a shallow vessel or a plate, the strainer may be turned around to present its uninterrupted surface to the shallow vessel, and the same process employed.

It will be evident that in the application of the rectangular vessel the member 16 forms an elevated shelf or pocket in which to rest the vessel clear of or above the sink or other support for the disk as the vessel is tilted toward the face of the strainer. On the other hand, the member 16 does not form any impediment to the application of the round type of vessel, permitting a vessel of any size to be applied within the circumferential limits of the disk. Besides, the strainer may be presented with its reverse side for the application of any type of vessel.

It will be apparent that the simply constructed strainer fully serves its purpose without extension or development to the form of a vessel. Clearly, a vessel is not actually needed for the straining facility, and the present strainer supplements the original vessel for the purpose. In this manner, a strainer is had which is of light and simple construction, yet durably made and very handy to use. It requires only one hand to handle it; and when its use is over it may be hung up with other light utensils by means of the screw-eye 18 to lie close to the wall and be out of the way. Finally, it will be appreciated that a utensil of the above character may be produced at low cost and gain a wide distribution because of its consequent low selling price.

While I have described the invention along specific lines, various minor changes and refinements may be made without departing from its principle, and I desire to consider all such changes and refinements as coming within the scope and spirit of the appended claims.

I claim:

1. A food strainer comprising a disk of sheet material containing perforations, a handle extended from the rim of the disk, and a member attached to one face of the disk and serve as a rest for a vessel employing the disk as a strainer, said member being an angle plate applied with one of its side edges to the disk.

2. A food strainer comprising a disk of sheet material containing perforations, a handle extended from the rim of the disk, and a member attached to one face of the disk and serve as a rest for a vessel employing the disk as a strainer, said member being an angle plate formed with perforations and applied with one of its side edges to the disk.

3. A food strainer comprising a disk of sheet material containing perforations, a handle extended from the rim of the disk, and a right-angled plate applied with one of its side edges to the disk and serving as a rest for a vessel employing the disk as a strainer, the plate being spaced from the rim of the disk whereby to rest the vessel in an elevated position when the disk is stood over a supporting surface with the handle projecting laterally.

4. A food strainer comprising a disk of sheet material containing perforations, a handle extended from the rim of the disk, and a right-angled plate applied with one of its side edges to the disk, and serving as a rest for a vessel employing the disk as a strainer, the handle in such event being in a laterally-projected position and one arm of the plate horizontally positioned, while the other arm rises from that end of the horizontal arm which is proximate to the handle.

ELLIOTT P. QUINBY.